(12) United States Patent
Daly et al.

(10) Patent No.: US 8,635,622 B2
(45) Date of Patent: Jan. 21, 2014

(54) METHOD AND SYSTEM FOR RESOURCE MANAGEMENT USING FUZZY LOGIC TIMELINE FILLING

(75) Inventors: Douglas G. Daly, Los Angeles, CA (US); William Rudnisky, Los Angeles, CA (US); James J. Hiroshige, Hawthorne, CA (US); Charles A. Livingston, Plano, TX (US)

(73) Assignee: Raytheon Company, Waltham, MA (US)

( * ) Notice: Subject to any disclaimer, the term of this patent is extended or adjusted under 35 U.S.C. 154(b) by 644 days.

(21) Appl. No.: 12/559,971

(22) Filed: Sep. 15, 2009

(65) Prior Publication Data

US 2011/0067032 A1    Mar. 17, 2011

(51) Int. Cl.
*G06F 9/46*    (2006.01)

(52) U.S. Cl.
USPC ......................................................... 718/103

(58) Field of Classification Search
None
See application file for complete search history.

(56) References Cited

U.S. PATENT DOCUMENTS

| | | | | |
|---|---|---|---|---|
| 6,073,182 A * | 6/2000 | Jones et al. | | 709/253 |
| 2004/0179528 A1 * | 9/2004 | Powers et al. | | 370/392 |
| 2006/0190944 A1 * | 8/2006 | Moon et al. | | 718/104 |
| 2007/0050774 A1 * | 3/2007 | Eldson et al. | | 718/104 |
| 2008/0040630 A1 * | 2/2008 | Travostino et al. | | 714/11 |
| 2009/0064169 A1 * | 3/2009 | Nguyen et al. | | 718/105 |

FOREIGN PATENT DOCUMENTS

AU        658412  B2    11/1992

OTHER PUBLICATIONS

Ding, et al. "A Survey of Radar Resource Management Algorithms", Electrical and Computer Engineering, 2008. CCECE 2008. Canadian Conference on , IEEE, Piscataway, NJ, May 4, 2008, pp. 1559-1564.
European Search Report and Written Opinion mailed May 15, 2012 for EP10169483, European Filing Date Jul. 14, 2010.
Miranda, et al. "Knowledge-Based Resource Management for Multifunction Radar: A Look at Scheduling and Task Prioritization", IEEE Signal Processing Magazine, IEEE Service Center, Piscataway, NJ, vol. 23, No. 1, Jan. 1, 2006, pp. 66-76.

* cited by examiner

*Primary Examiner* — Emerson Puente
*Assistant Examiner* — Sisley Kim
(74) *Attorney, Agent, or Firm* — Cantor Colburn LLP

(57) ABSTRACT

In one or more embodiments, a method and system for scheduling resources is provided. The method includes receiving, in a processor, a plurality of concurrent processing requests. Each concurrent processing request is associated with at least one device configured to perform one or more different tasks at a given time. The at least one device has a predefined processing capacity. If one or more of the plurality of concurrent processing requests exceeds the predefined capacity of the at least one device at the given time, the processor determines a priority score for each concurrent processing request based, at least in part, on a time value associated with each concurrent processing request and whether any one of the concurrent processing requests is currently being processed at the given time. Responsive to the determined priority score at the given time, a highest priority processing request is executed for the at least one device.

33 Claims, 12 Drawing Sheets

(BACKGROUND)

|  | SCHEDULING METHOD | AVG. TIME TO COMPLETE | MIN/MAX REVISIT TIME |
|---|---|---|---|
| REQUEST 1 | GOAL | 10 | 20 |
|  | SPOT-INTERLEAVING | 19 | 20/20 |
|  | RANK FILLING | 10 | 20/20 |
|  | PROPOSED METHOD | 10 | 15/25 |
| REQUEST 2 | GOAL | 15 | 30 |
|  | SPOT-INTERLEAVING | 29 | 30/30 |
|  | RANK FILLING | 25 | 25/35 |
|  | PROPOSED METHOD | 20 | 25/35 |

FIG. 12

METHOD AND SYSTEM FOR RESOURCE MANAGEMENT USING FUZZY LOGIC TIMELINE FILLING

BACKGROUND

This disclosure relates generally to methods, systems, and computer program products for scheduling one or more computer-system related resources.

For many different types of applications, resource(s) may be tasked in a fashion such that meeting the requirements of all requests is impossible. This may be true for Intelligence, Surveillance, and Reconnaissance (ISR) applications where a region of the earth needs to be viewed at regular intervals, for example. Therefore, different methods may be employed for having resource(s) execute requests. One such method may be known as "spot interleaving," as shown in FIG. 1A. The "spot interleaving" method generally involves executing a first request, and before the first request has completed, pausing the first request and begin executing a second request. The second request is then paused after a period of time, at which point either the first request or yet another task is resumed, and vice versa. Therefore, the resource(s) interleaves all requests until at least one of the requests is completed. A problem with the "spot interleaving" method is that excessive interleaving may cause inefficient use of resource(s), resulting in longer periods of time and/or more processing for completing requests.

Another method may be known as the "rank filling" method, as shown in FIG. 1B. The "rank filling" method generally involves assigning each request (or task) a rank. The higher ranked requests are performed before lower ranked requests are performed. Lower ranked requests then "fill-in" times when the resource(s) is available. A problem with the "rank filling" method is that it is inflexible; the highest rank task is performed exactly as requested and the other tasks are performed very inefficiently or not at all.

Another method may be known as "long range planning." The long-range planning method involves planning ahead of time when to perform certain requests through considering all possible scheduling plans and selecting the one with the best score. Drawbacks of the "long range planning" method are that it is inflexible and computationally intensive. Because the timeline of when to execute requests is planned ahead of time, the timelines needs to be recomputed when requests are added and deleted. Also, the "long range planning" method may become computationally intensive, especially when the number of requests and length of the timeline grows.

SUMMARY

In one or more embodiments, a computer-implemented method for scheduling resources is provided. The method comprises receiving, in a processor, a plurality of concurrent processing requests, wherein each concurrent processing request is associated with at least one device configured to perform one or more different tasks at a given time. The at least one device has a predefined processing capacity. If one or more of the plurality of concurrent processing requests exceeds the predefined capacity of the at least one device at the given time, the processor determines a priority score for each concurrent processing request based, at least in part, on a time value associated with each concurrent processing request and whether any one of the concurrent processing requests is currently being processed at the given time. Responsive to the determined priority score at the given time, a highest priority processing request is executed for the at least one device.

In other embodiments, a system for scheduling resources is provided. The system comprises at least one device having a predefined processing capacity, wherein the at least one device is configured to execute a highest priority processing request. The system further comprises a processor configured to receive a plurality of concurrent processing requests, wherein each concurrent processing request is associated with one of a plurality of devices each configured to perform one or more different tasks at a given time. If one or more of the plurality of concurrent processing requests exceeds the predefined processing capacity of the at least one device at the given time, the processor determines a priority score for each concurrent processing request based, at least in part, on a time value associated with each concurrent processing request and whether any one of the concurrent processing requests is currently being processed at the given time.

In another embodiment, a computer program product is disclosed. The computer program product comprises a machine-readable medium having machine-readable program embodied therein, said machine-readable program, when executed by a processor, being configured to carry out resource scheduling functions. The functions comprise receiving a plurality of concurrent processing requests, wherein each concurrent processing request is associated with at least one device configured to perform one or more different tasks at a given time, wherein the at least one device has a predefined processing capacity. If one or more of the plurality of concurrent processing requests exceeds the predefined capacity of the at least one device at the given time, the functions further comprise the processor determining a priority score for each concurrent processing request based, at least in part, on a time value associated with each concurrent processing request and whether any one of the concurrent processing requests is currently being processed at the given time. Responsive to the determined priority score at the given time, a highest priority processing request is executed for the at least one device.

These and other features and characteristics, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various Figures. It is to be expressly understood, however, that the drawings are for the purpose of illustration and description only and are not intended as a definition of the limits of claims. As used in the specification and in the claims, the singular form of "a", "an", and "the" include plural referents unless the context clearly dictates otherwise.

BRIEF DESCRIPTION OF THE DRAWINGS

FIG. 12 illustrates a table comparing performance of the spot interleaving, rank filling, and proposed methods for scheduling resources in a simulation.

DETAILED DESCRIPTION

Figure 1:
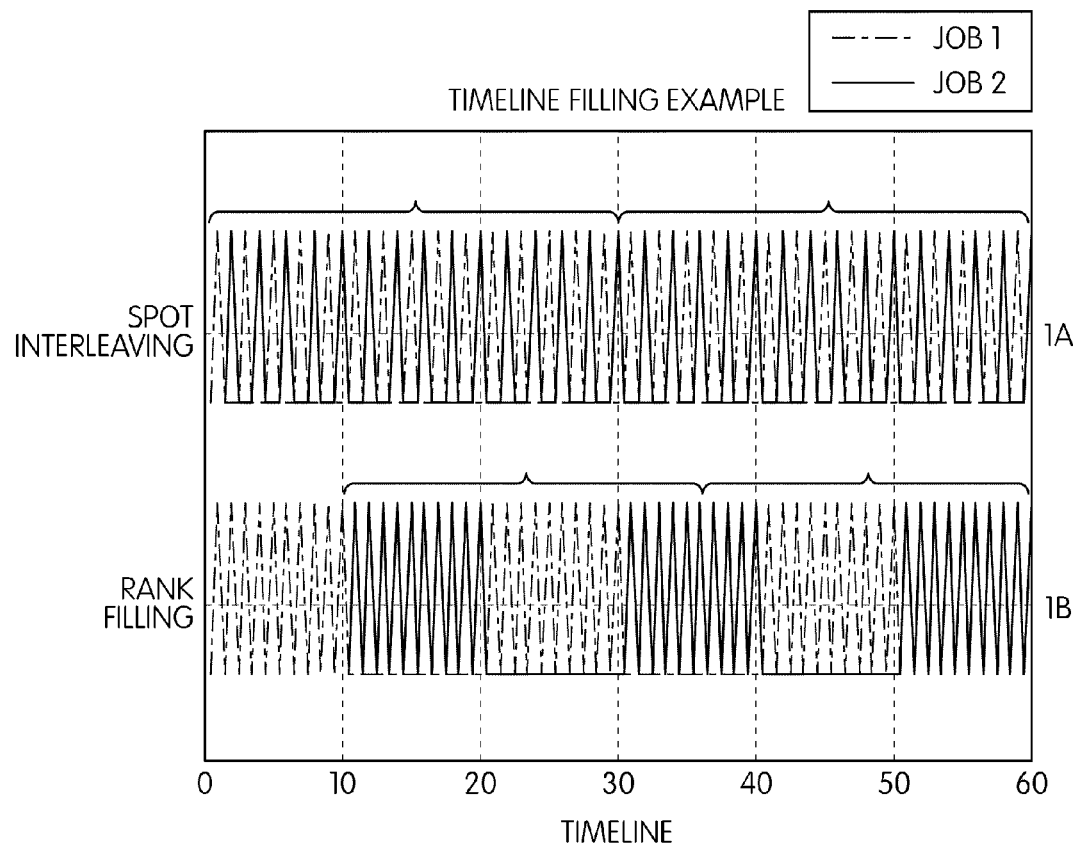
FIGS. 1A and 1B illustrate performance of conventional spot interleaving and rank filling methods.

In the description that follows, like components have been given the same reference numerals, regardless of whether they are shown in different embodiments. To illustrate an embodiment(s) of the present disclosure in a clear and concise manner, the drawings may not necessarily be to scale and certain features may be shown in somewhat schematic form. Features that are described and/or illustrated with respect to one embodiment may be used in the same way or in a similar way in one or more other embodiments and/or in combination with or instead of the features of the other embodiments.

The present disclosure relates to a method, system, and computer program product for scheduling resources, in particular, computer-system related resources. First, a plurality of concurrent processing requests are received by a processor. Each concurrent processing request is associated with a device configured to perform one or more different tasks at a given time. Second, if one or more of the concurrent processing requests exceeds the predefined capacity of the device at the given time, the processor determines a priority score for each concurrent processing request based, at least in part, on a time value associated with each concurrent processing request and whether any one of the concurrent processing requests is currently being processed. Third, responsive to the determined priority score at the given time, a highest priority processing request for the at least one device is executed. The present disclosure both enables filling of a timeline to meet requests for resources and ensures the performance of higher-value tasks before performance of lower-value tasks.

Figure 2:
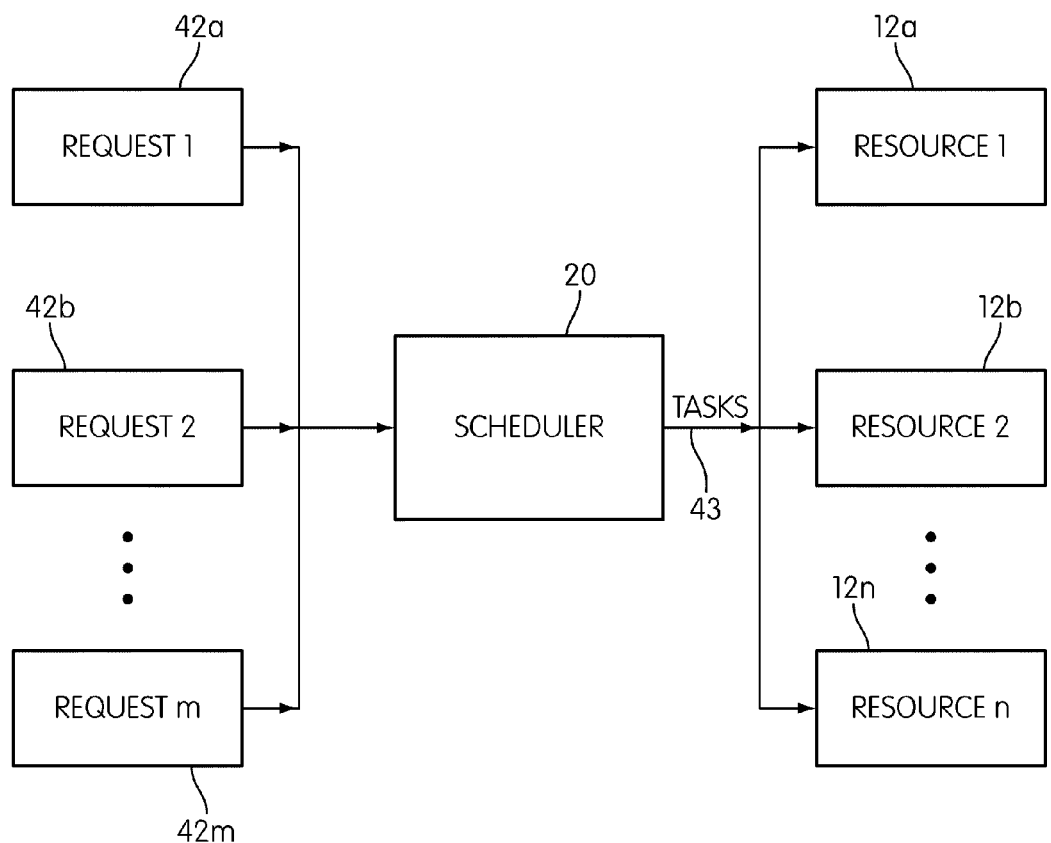
FIG. 2 illustrates a schematic view of one embodiment of a process flow diagram for a system for scheduling resources.

FIG. 2 illustrates one embodiment of a process flow diagram for a system for scheduling resources. As shown in FIG. 2, resource scheduler 20 receives one or more processing requests 42 (e.g., 42a, 42b, ..., 42m). Processing requests 42 may request one or more resources 12 (e.g. 12a, 12b, ..., 12n) to perform one or more tasks 43 at scheduled times. The tasks 43 may be one or more tasks that recur regularly in time. Resources 12 may be one or more devices. For example, resources 12 may be one or more sensors, such as Synthetic Aperture Radar or Multispectral Thermal Imager, or other Intelligence Surveillance Reconnaissance (ISR) systems. Another example involves communications on a computer system where regions of memory need to be periodically read and/or updated while the processor also needs to perform other computing tasks. It should be appreciated that resources 12 may be any processing devices, such as processors and/or computing devices, configured to perform various processing requests. Each resource 12 has a predefined processing capacity. Resource scheduler 20 is configured to determine which processing request(s) one or more resources 12 performs at a given time.

Figure 3:
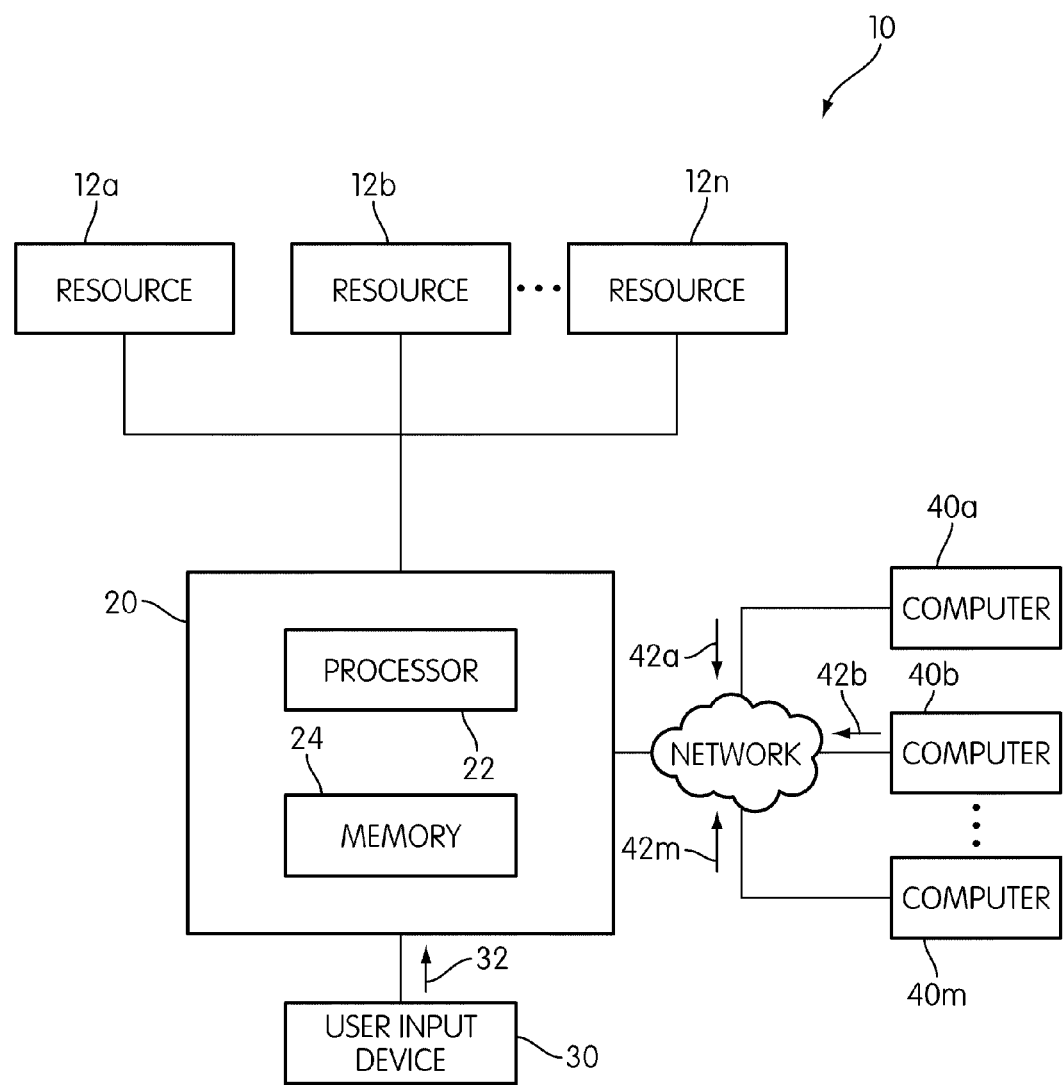
FIG. 3 illustrates a schematic view of one embodiment of a system for scheduling resources.

FIG. 3 illustrates one embodiment of a system 10 for scheduling one or more resources 12a, 12b, ..., 12n. System 10 includes resource scheduler 20. Resource scheduler 20 may include processor 22 and memory 24. Processor 22 may be dedicated hardware like ASICs or FPGAs, software, firmware, or a combination of dedicated hardware and software. Processor 22 may be one processor or may include one or more sub-processors or distributed processors. Resource scheduler 20 may be connected to user input device 30. Resource scheduler 20 may be configured to receive inputs 32 from user input device 30. Inputs 32 may relate to the scheduling, priority, or priority determination of one or more requests or tasks. Inputs 32 may also be one or more processing requests for resources 12 to perform one or more tasks at scheduled times. Resource scheduler 20 may also be configured to receive one or more processing requests 42 (e.g., 42a, 42b, ..., 42m) from one or more computers 40 over a network.

Figure 4:
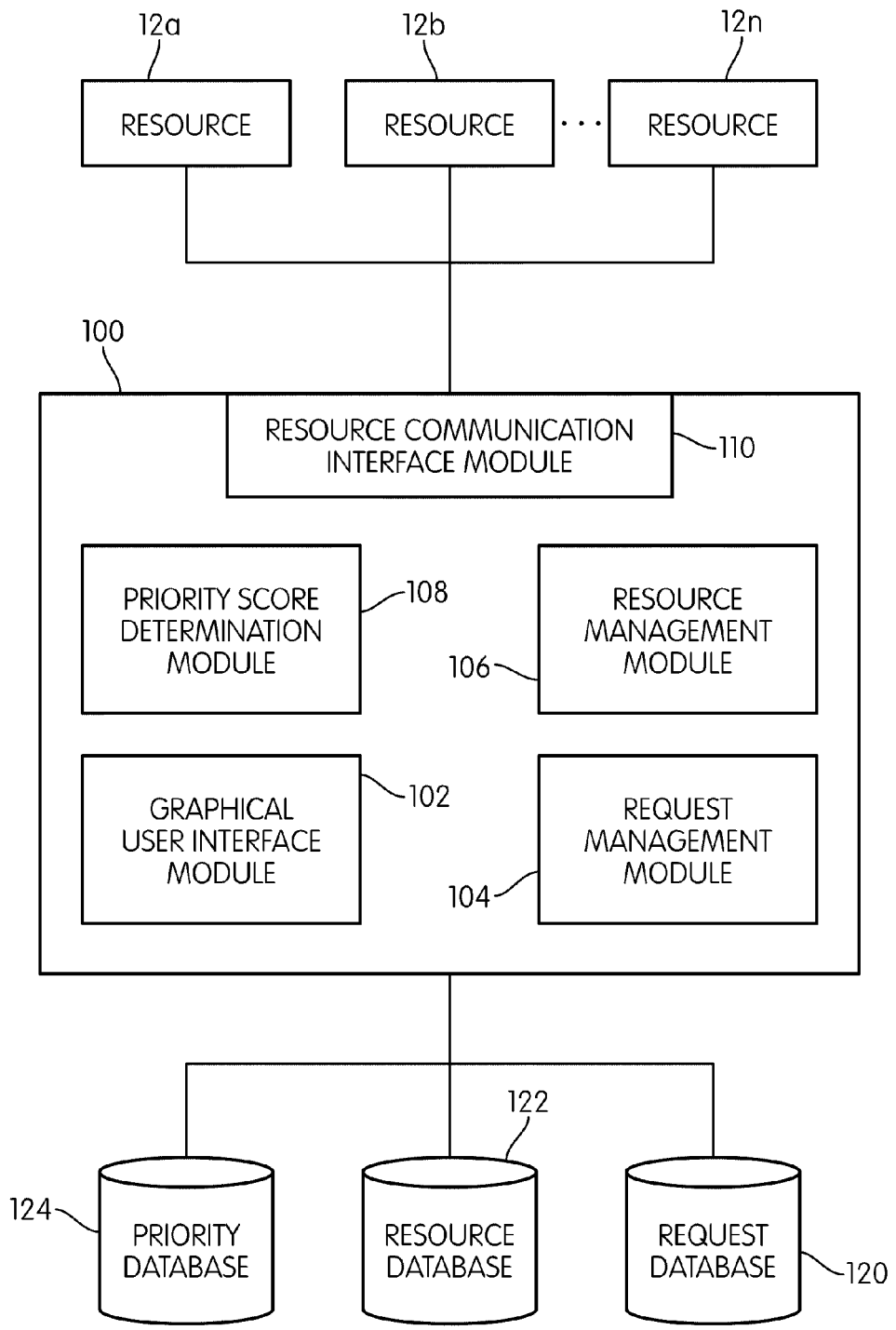
FIG. 4 illustrates a schematic view of one embodiment of a functional block diagram for scheduling resources.

FIG. 4 illustrates one embodiment of application 100 for scheduling one or more resources 12. Application 100 may be executed by processor 22 (shown in FIG. 3) for example. Application 100 may include a plurality of modules, including but not limited to, graphical user interface module 102, request management module 104, resource management module 106, priority score determination module 108, and resource communication interface module 110. One or more of the modules comprising application 100 may be combined and/or include additional modules. These modules may be implemented in hardware, software executed in a processor, or by a combination of hardware and software.

Application 100 may interface with one or more additional systems, such as request database 120, resource database 122, priority database 124, and resources 12. For some purposes, not all modules and elements may be necessary. Request database 120, resource database 122, and/or priority database 124 may reside in memory 24 (shown in FIG. 3).

According to one embodiment, application 100 may be implemented by software (firmware) created using any number of programming languages. Of course, it will be appreciated any number of hardware implementations, programming languages, and operating platforms may be used. As such, the description or recitation of any specific hardware implementation, programming language, and operating platform herein is exemplary only and should not be viewed as limiting.

Application 100 may be stored on a computer- or machine-readable storage media having computer or machine-executable instructions executable by a processor. In one implementation, application 100 may reside in a memory coupled to processor 22 (shown in FIG. 3).

Alternatively, or additionally, application 100 may be a stand-alone application running on a computer which interfaces with a printing system, for example, through a remote network connection, or via a computer readable storage media (e.g., flash memory, DVD/CD ROM, floppy disk, removable or permanent hard drive etc.). In some implementations, application 100 may be a "plug-in" application that is incorporated into a third-party software application including, for example, document-processing or image production applications. Other configurations also may be implemented.

Graphical user interface module 102 maybe configured to generate a graphical user interface (GUI) on a display device and to control the various display and input/output (I/O) features of the application. Graphical user interface module 102 may generate display signals for the display device. In one implementation, it may provide one or more "windows" or panes for displaying information to the user. The display device may include a cathode ray tube (CRT), liquid crystal display (LCD), plasma, or other display devices.

Moreover, graphical user interface module 102 allows the user to interact with application 100. For example, the graphical user interface module 102 may permit use and operation of one more user input devices 30 (shown in FIG. 3), such as: a keyboard, keypad, touch-screen, mouse, joystick, light pen, or other peripheral devices for receiving inputs from a user. Similarly, the application may output information and data to the user, for example, via a printer or other peripheral device (e.g., external storage device or networked devices).

Graphical user interface module 102 may interact with a computer's operating system and/or one or more other software applications. In one implementation, application 100 may comprise a stand-alone software application running on a computer, printing system, or other machine. Alternatively, a server (not shown) may host application 100, which may, in some implementations, require a user to access the server over a network to use the application. In some implementations, a user may download application 100 from a server, with program updates made available (over the network or the Internet) as needed, or on a predetermined, regularly-scheduled basis. Application 100 may be operated in a Microsoft Windows® operating environment. However, other operating systems and environments (e.g., UNIX, Linux, and proprietary systems, such as Apple Mac OS X) are also envisioned.

The request management module 104 may interface with at least one request database 120, which stores and maintains data relating to one or more request, such as the tasks associated with the request, time required to complete each request or task, how often each request should be executed, whether the request is currently being executed, etc. Request database 120 could be, in some implementations, located remotely from application 100 and interface, for example, via a network. In one implementation, request management module 104 may also permit users to create new requests to be executed, and/or edit or modify data relating to the requests in request database 120.

Resource management module 106 may interface with at least one resource database 122 which stores and maintains data and/or information relating to one or more resources, such as the type of resources, the capacity of the resources, the usage of the resources, etc. Resource management module 106 may also interface with resource communication interface module 110 to receive updated information relating to one or more resources 12. Resource database 122 could be, in some implementations, located remotely from the application 100 and interface, for example, via a network. In one implementation, resource management module 106 may also edit, modify, or update data relating to resources 12 in resource database 122 based on the updated information received from resource communication interface module 110.

Priority score determination module 108 may interface with at least one priority database 124 which stores and maintains data and/or information relating to priority of one or more requests, such as priority curves related to requests, priority scores, etc. Priority database 123 could be, in some implementations, located remotely from application 100 and interface, for example, via a network. Priority score determination module 108 may also interface with graphical user interface module 102, request management module 104, resource management module 106, and resource communication interface module 110 to receive or retrieve information relevant to determining priority of different requests for a given time.

Resource communication interface module 110 may interface with at least one resource 12. Resource communication interface module 110 may communicate one or more requests to resources 12. Resource communication interface module 110 may also receive status updates from resources 12 relating to what tasks are in progress, whether tasks are completed, etc.

Figure 5:
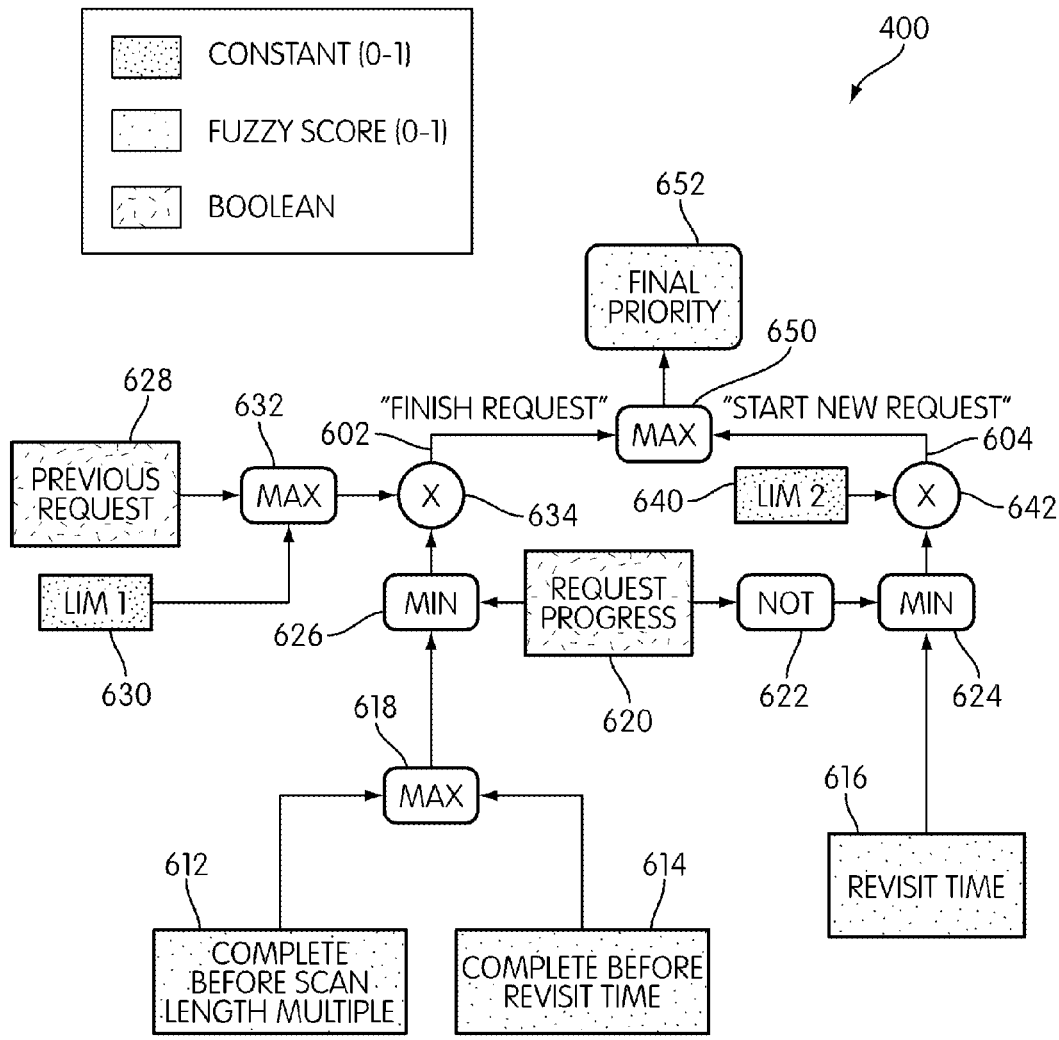
FIG. 5 illustrates a schematic view of one embodiment of a logic flow diagram for determining a priority of each request.

FIG. 5 illustrates one embodiment of a logic flow diagram for determining a priority of requests using various sub-modules. An associated method may be performed by the priority score determination module 108 (shown in FIG. 4) or processor 22 (shown in FIG. 3) for example. The priority score for each request may be determined at certain pre-defined time increments, such as every second for example. Diagram 400 includes two branches, the "finish request" branch 602 and "start new request" branch 604. Generally, the "finish request" branch gives higher priority to requests that: (1) are expected to complete after the requested revisit time, or (2) are expected to complete after a pre-defined multiple of the length of time required to complete the request. The system includes sub-modules 612, 614 and/or 616. In sub-module 612, a priority score for a request is determined based on a time relative to a multiple of the time required to complete the request (the "request length multiple"). The request length multiple time represents a point in time that is a predetermined multiple of one or more lengths of time ahead of a point in time at which the request was scheduled to be completed. The purpose of sub-module 612 is to help ensure that a processing request is completed before a multiple of the length of time required to complete the processing request. This may help ensure that "small scans" are completed quickly. In sub-module 614, a priority score for the request is determined based on a time relative to a scheduled revisit time. The scheduled revisit time is a point in time at which a request is scheduled to be revisited. The purpose of sub-module 614 is to help ensure a processing request is completed before it is scheduled to repeat. This helps prevent "large scans" from falling behind schedule. In sub-module 616, a priority score is determined based on the scheduled revisit time of the request. For each request, the priority score is determined based on one or more priority curves, such as priority curves shown in FIGS. 6A and 6B. In sub-module 618, the maximum priority score is determined between a priority score based on the request length multiple time of the request and a priority score based on the revisit time of the request.

Sub-module 620 determines if the request is in progress. Sub-module 620 may determine if the request is in progress through request management module 104. If a request is in progress, sub-module 620 returns a logical "1." If a request is not in progress, sub-module 620 returns a logical "0." In sub-module 622, the value returned in sub-module 610 is reversed.

In sub-module 624, a minimum value between the value from sub-module 622 and sub-module 616 is determined. If the request is in progress, i.e. being executed, the value returned from sub-module 624 is "0." Sub-module 640 represents a constant value. The constant value may be between 0 and 1. Therefore, the purpose of sub-modules 616, 622, and 624 is to begin executing a request if the request is due to begin. However, if processing of the request has already begun, the priority on the "start new request" branch is 0. Sub-module 640 represents a pre-defined constant value. The pre-defined constant value of sub-module 640 may be between 0 and 1. In sub-module 642, the value returned from sub-module 624 is multiplied by the value returned from sub-module 640.

In sub-module 626, a minimum value between the value from sub-module 618 and sub-module 620 is determined. If a request is not in progress, the value returned from sub-module 626 is "0," resulting in the priority score of the "finish scan" branch to be made "0." In sub-module 628, a determination is made whether a previous "spot" was part of the current request in progress. Each "spot" may represent a time period. The time period value may be the time between when the one or more concurrent processing requests are evaluated to determine priority. If the previous spot was part of the request in progress, a "1" is returned, otherwise, a "0" is returned. Sub-module 630 represents a pre-defined constant value. The pre-defined constant value of sub-module 630 may be between 0 and 1. In sub-module 634, the value returned from sub-module 632 is multiplied by the value returned from sub-module 626. In sub-module 650, the maximum between the value returned by sub-module 634 and sub-module 642 is returned. Sub-module 652 then determines the final priority score of the evaluated request. One purpose of sub-modules 628, 630, 632, and 634 is to reduce the priority of processing requests different from the previous spot. This may help reduce the frequency of interleaving, switching between requests. Interleaving still may occur if one processing request is much more urgent, i.e. higher priority, than the others.

It should be appreciated that the pre-defined constant values of sub-modules 630 and 640 may be user inputted values. By allowing the user to determine the constant value of sub-module 630 and/or 640, the user has increased flexibility and control over the level or degree of interleaving and periodicity of the requests. The user can effectively balance and trade-off between the objectives of minimizing the time required to complete requests, and revisiting requests at scheduled revisit times, i.e. maintaining the periodicity of the requests. The user input may be received from user input device 30 (shown in FIG. 3), one or more computers 40 (shown in FIG. 3), and/or graphical user interface module 102 (shown in FIG. 4).

Figure 6A:
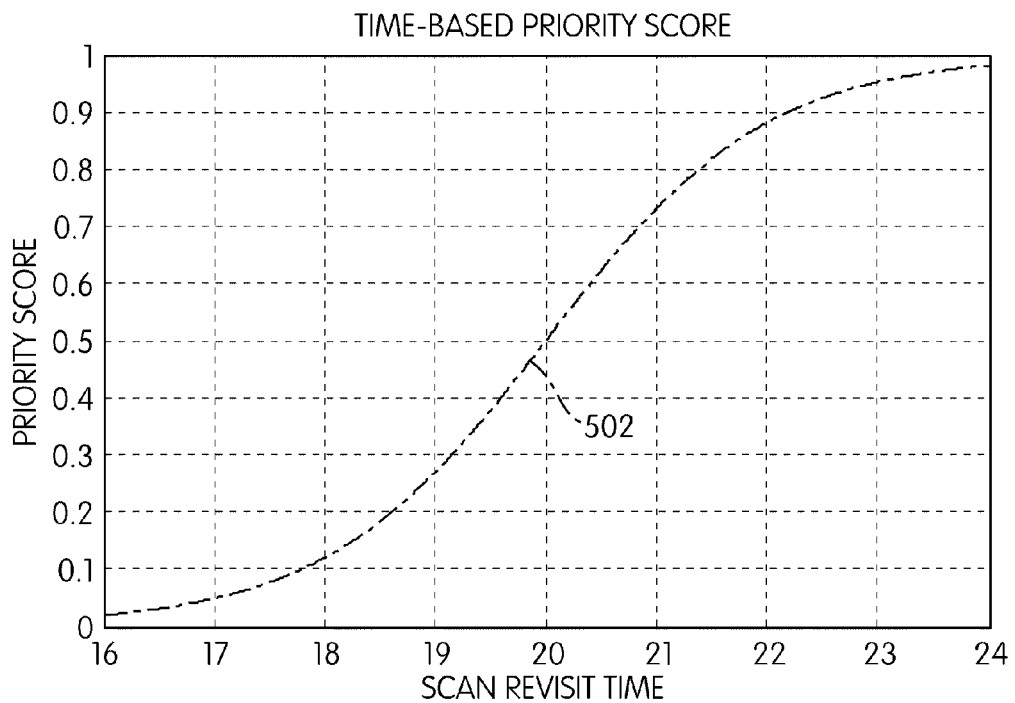
FIGS. 6A and 6B illustrate embodiments of priority curves.
Figure 6B:
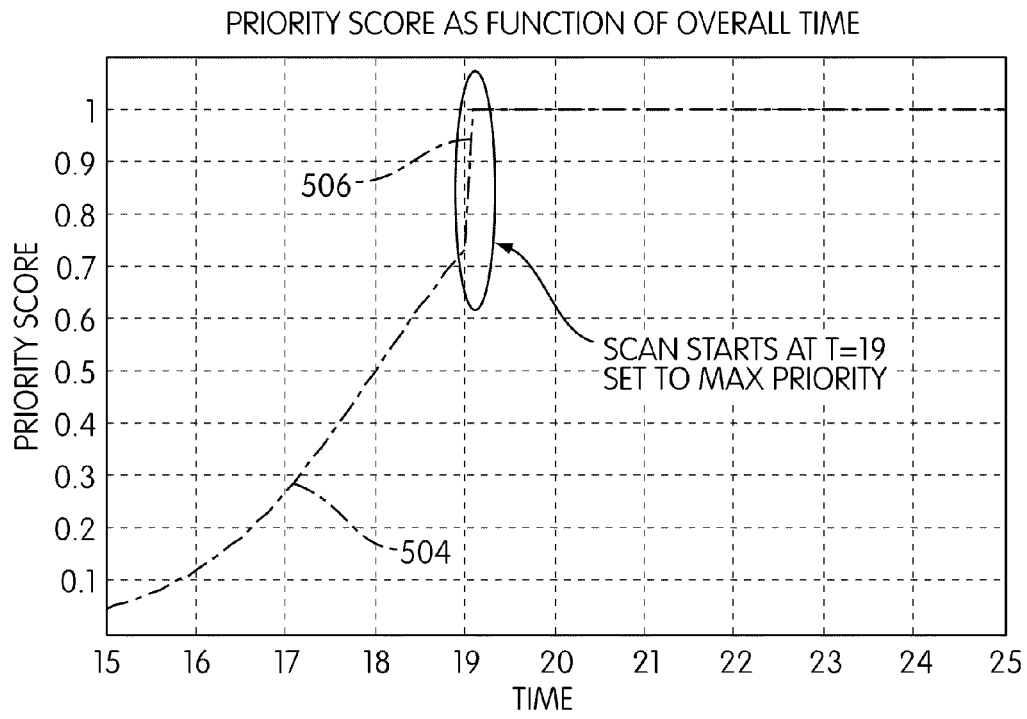

FIGS. 6A and 6B illustrate different embodiments of priority curves. As shown, FIGS. 6A and 6B both represent non-linear priority curves. Because the priority may be any value between 0 and 1, priority score may be considered a "fuzzy logic" score. FIG. 6A shows a priority curve 502 where the priority score drastically increases between a revisit time of eighteen (18) and twenty-two (22) seconds. The priority score then approaches one (1) as the revisit time increases. FIG. 6B shows a priority curve reflecting "hard" constraints. As shown in FIG. 6B, a priority curve 504 comprises a hard constraint 506, wherein the priority score is automatically set to a particular predetermined value, one (1), at a particular time, nineteen (19).

Figure 7:
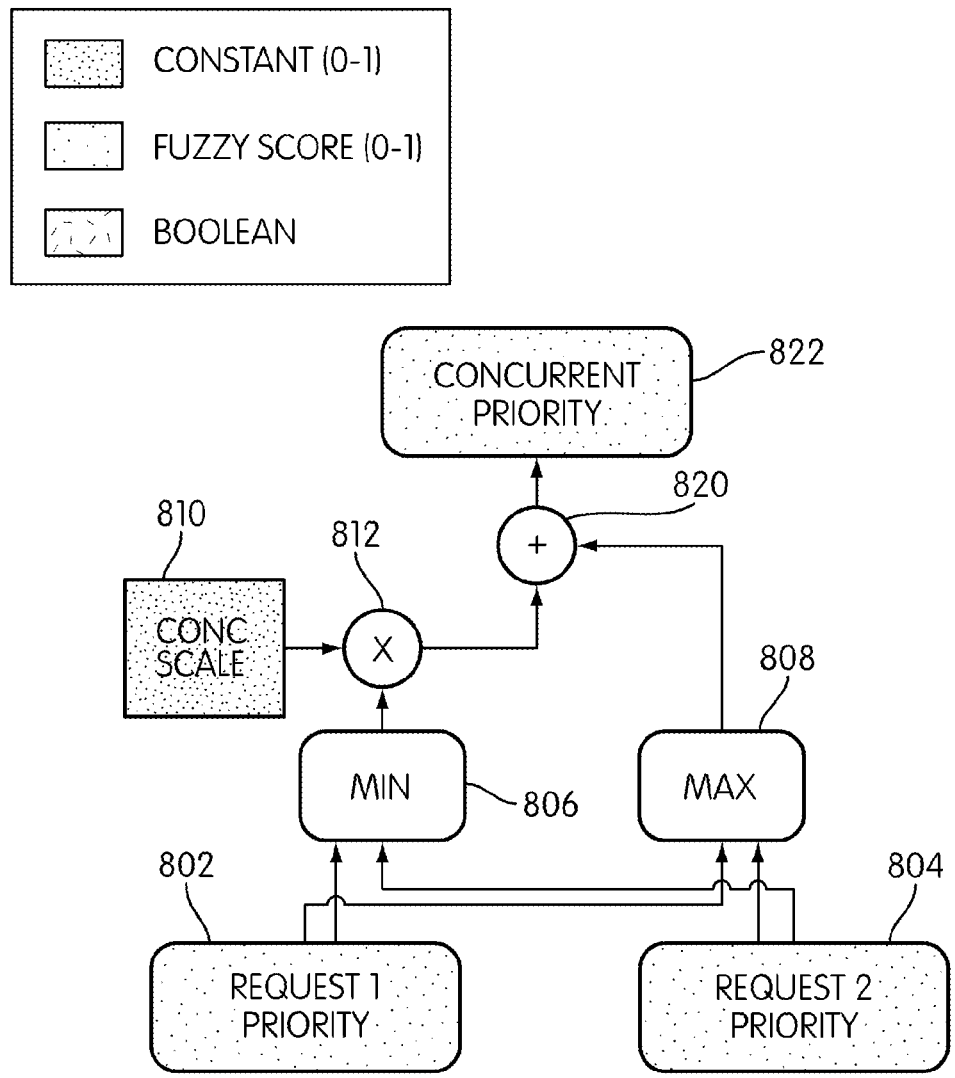
FIG. 7 illustrates one embodiment of a logic flow diagram for determining priority of requests that may be executed concurrently.

FIG. 7 illustrates one embodiment of a logic flow diagram for determining the priority score for requests that may be performed concurrently. As associated method may be performed by priority score determination module 108 for example. For example, priority score determination module 108 (shown in FIG. 4) may determine two or more requests that may be performed concurrently. To determine if two or more requests may be performed concurrently, priority score determination module 108 may communicate with request management module 104 (shown in FIG. 4). Request management module 104 may then determine the requests that may be performed concurrently, and communicate information relating to the requests to priority score determination module 108.

To determine the priority score of two (2) requests that may be performed concurrently, the priority score for each request is determined individually. The priority score of the two requests may be determined based on priority curves, such as the priority curves shown in FIGS. 6A and 6B for example. The priority score for the first request ("Request 1") may be determined in sub-module 802. The priority score for the second request ("Request 2") may be determined in sub-module 804. In sub-module 806, the minimum priority score between the priority score of Request 1 and Request 2 is determined. In sub-module 808, the maximum priority score between the priority score of Request 1 and Request 2 is determined. Sub-module 810 represents a constant Concurrent Scaling Value ("Scaling Value"). The Scaling Value represents the level of adjustment to the priority scores for requests that may be executed concurrently. The value of the Scaling Value directly corresponds to the priority score for requests that may be performed concurrently. The Scaling Value may be a user inputted value. The user input may be received from user input device 30 (shown in FIG. 3), one or more computers 40 (shown in FIG. 3), and/or graphical user interface module 102 (shown in FIG. 4). The Scaling Value may be a value between "0" and "1." In sub-module 812, the priority score determined in sub-module 806 is multiplied by the Scaling Value. In sub-module 820, the values determined in sub-module 812 and sub-module 808 may be added together. In sub-module 822, the concurrent priority score is determined for Request 1 and Request 2.

Figure 8:
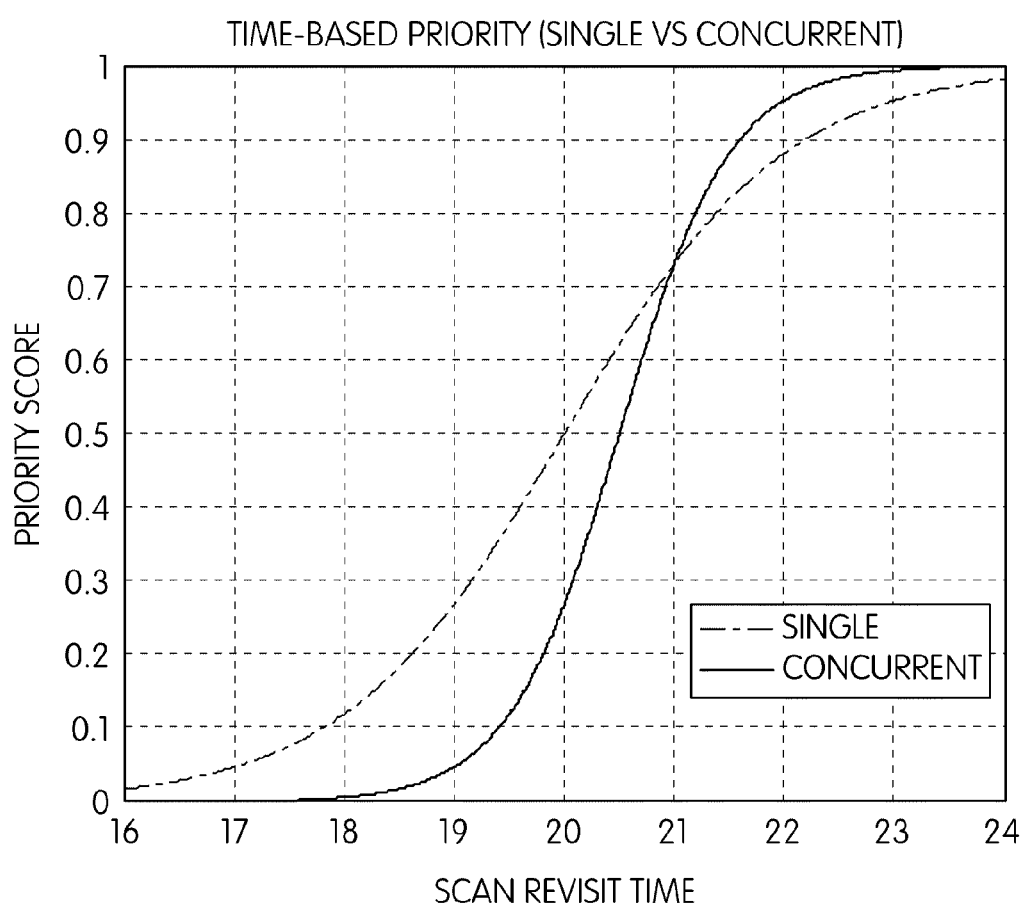
FIG. 8 illustrates one embodiment of priority curves for single and concurrent requests.
Figure 10:
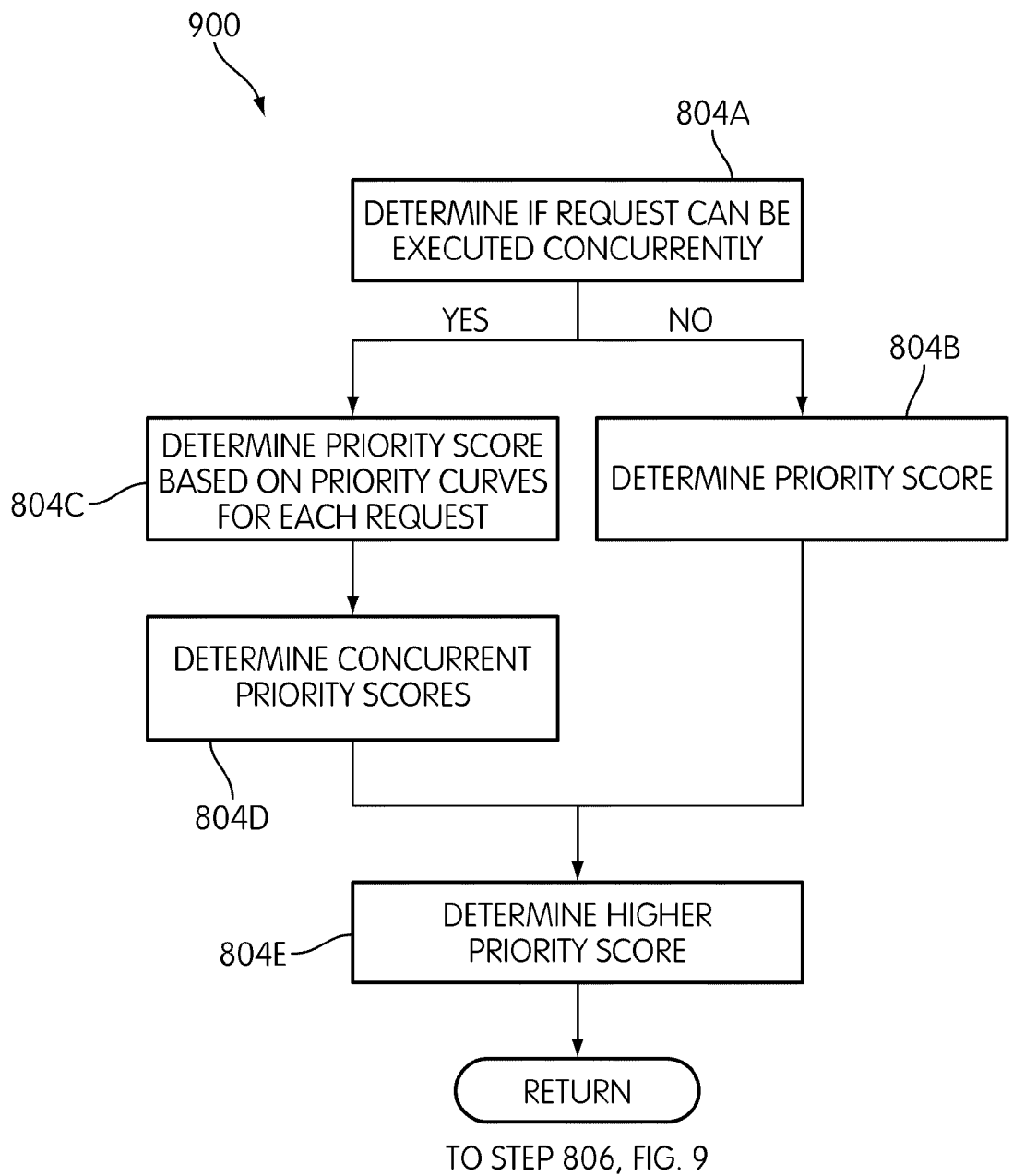
FIG. 10 illustrates one embodiment of a flowchart for determining a priority score for a request.

FIG. 8 illustrates one embodiment of priority curves for single and concurrent priority scores of a request. As shown in FIG. 10, the single priority score is higher than the concurrent priority score of the request until the revisit time reaches twenty (20) seconds, at which point, the concurrent priority score is higher than the single priority score.

Figure 9:
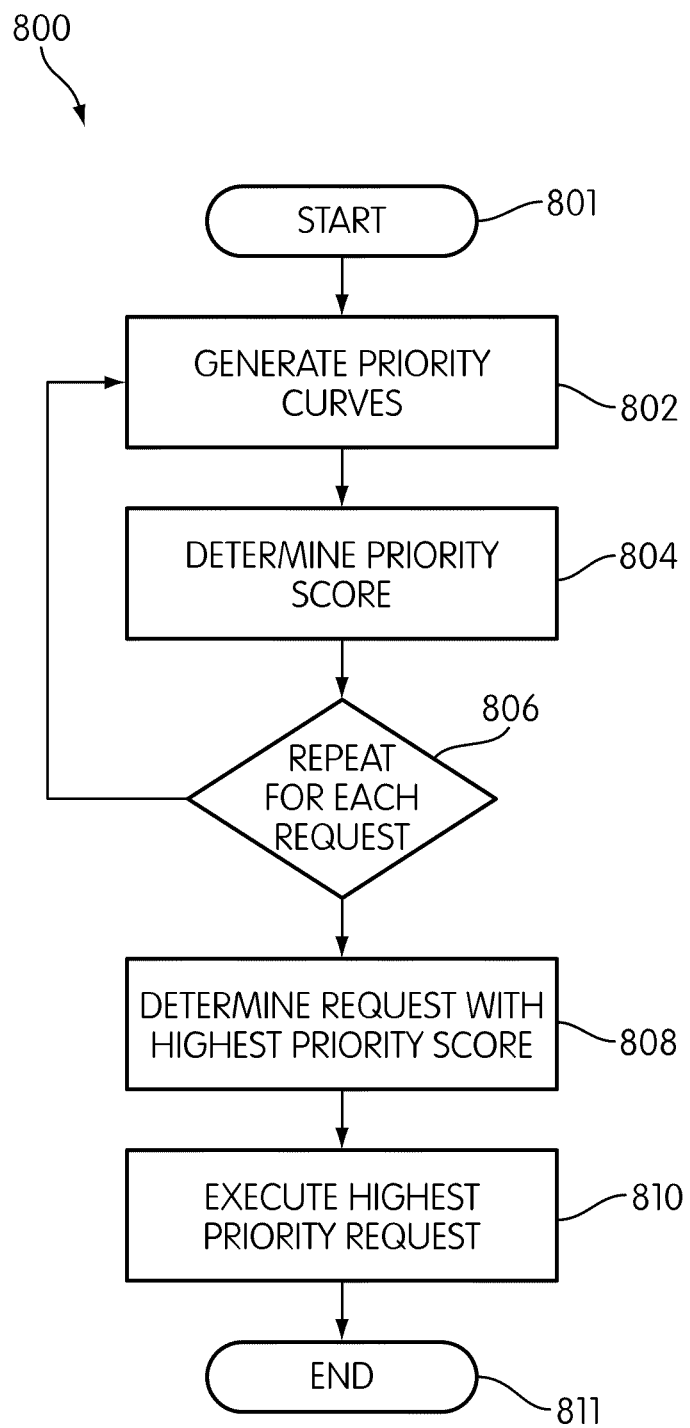
FIG. 9 illustrates one embodiment of a flowchart for determining a highest priority request.

FIG. 9 illustrates one embodiment of a flowchart for scheduling resources. The flowchart begins at step 801. In step 802, one or more priority curves, such as those shown in FIGS. 6A and 6B, are generated for a request. The one or more priority curves may be generated by priority score determination module 108 (shown in FIG. 4) and/or processor 22 (shown in FIG. 3) for example. The one or more priority curves may be stored in priority database 124 (shown in FIG. 4) and/or memory 24 (shown in FIG. 3) for example. In step 804, the priority score is determined based on at least one of the priority curves, a time value, and whether any one of the concurrent processing requests is currently being processed at the given time. Step 804 may comprise one or more steps shown in FIG. 10. For example, the time value may be a time value relative to a multiple of the required time to complete the request or a task associated with the request, or a time value relative to scheduled revisit time of the request. Step 804 may be performed using the system shown in FIG. 5 for example. In step 806, steps 802 and 804 are repeated for each request. In step 808, the request with the highest associated priority score is determined. In step 810, the highest priority request is executed. The flowchart ends at step 811.

FIG. 10 illustrates an exemplary implementation 900 of step 804 (shown in FIG. 9) for determining the priority score of a request. Step 804A determines whether a request can be executed concurrently with one or more other requests. If the request cannot be executed concurrently with another request, then the priority score for the request is determined in step 804B based on at least one of the priority curves and a time value. If the request can be executed concurrently with another request, then the priority score for each request that may be executed concurrently is determined based on one or more priority curves associated with each request in step 804C. In step 804D, the concurrent priority score for the request is determined. The concurrent priority score may be determined using the system shown in FIG. 7 for example. In step 804E, the higher priority score between single request priority score determined in step 804B and the concurrent priority score determined in step 804D is returned.

Figure 11:
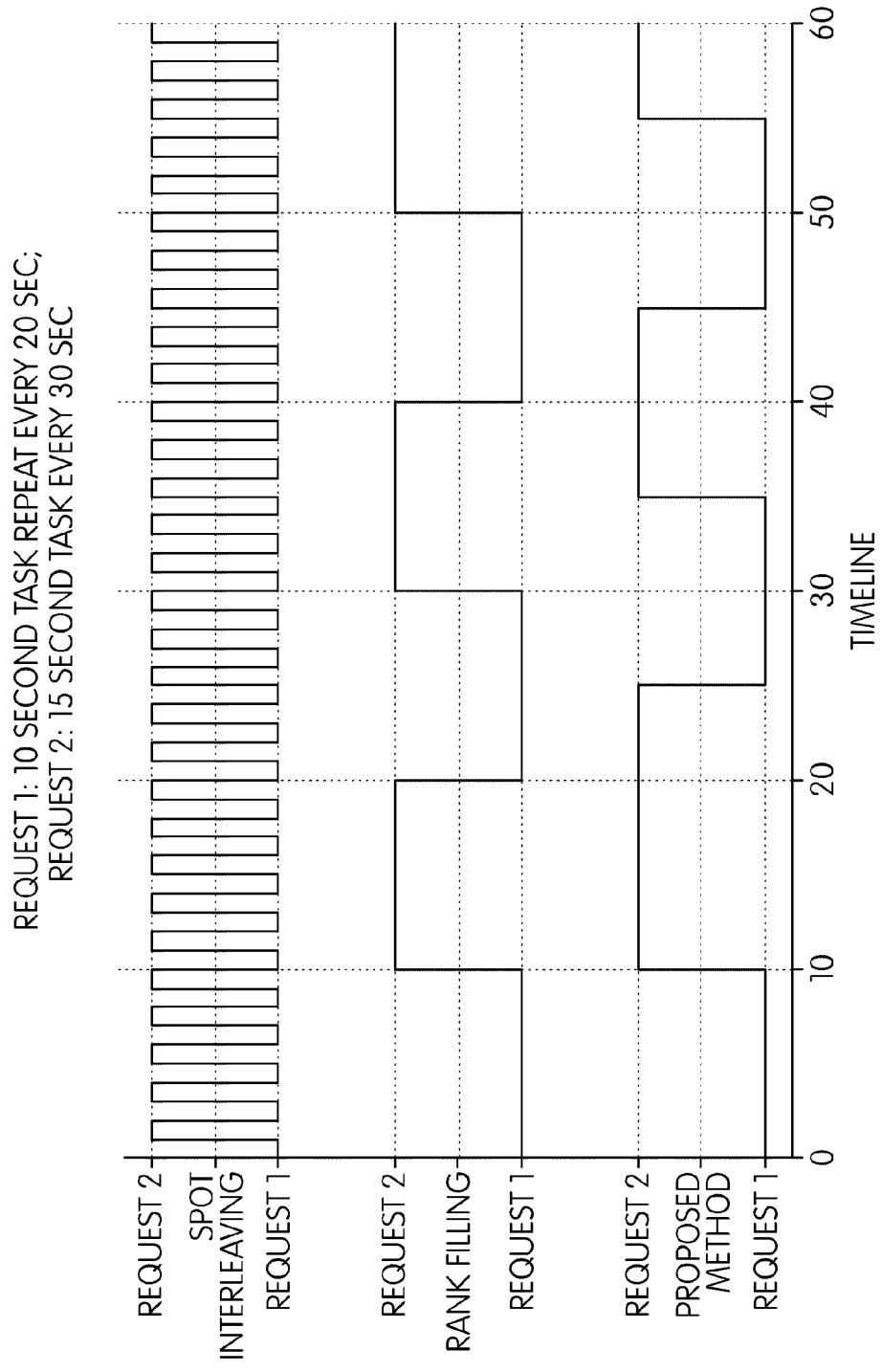
FIG. 11 illustrates a graph representing performance of the spot interleaving, rank filling, and proposed methods for scheduling resources in a simulation.

FIG. 11 illustrates a graph representing performance of spot interleaving, rank filling, and the proposed (presently described) methods of scheduling resources in a simulation involving a resource. Request 1 is a request that a ten (10) second task be performed every twenty (20) seconds. Request 2 is a request that a fifteen (15) second task repeat every thirty (30) seconds. As shown in FIG. 11, under the spot interleaving method, the resource constantly switches between Request 1 and Request 2. This constant switching reduces efficiency and causes Request 1 and Request 2 to process more slowly. Under the rank filling method, the processing of Request 1 consistently begins and ends on time at the expense of Request 2. Under the ranking filling method, the resource always stops processing Request 2 after 10 seconds and resumes processing Request 1. Under the proposed method, the priority of Requests 1 and 2 change with time. Therefore, depending on the priority of Request 1 and 2, Request 2 sometimes may complete at the expense of delaying the start of Request 1. At other times, the resource may switch from processing Request 2 to processing Request 1 before Request 2 has completed.

FIG. 12 illustrates a table comparing performance of the spot interleaving, rank filling, and proposed methods for scheduling resources in a simulation involving a resource. As shown in FIG. 12, the goal is for Request 1 to complete in ten (10) seconds and to be revisited every twenty (20) seconds, and for Request 2 to complete in fifteen (15) seconds and to be revisited every thirty (30) seconds. When comparing the spot-interleaving method to the proposed method for Request 1, the average time to complete Request 1 is substantially reduced from nineteen (19) seconds for the spot interleaving method to ten (10) seconds for the proposed method. However, the revisit time may range between from 15-25 seconds under the proposed method compared to a revisit time of twenty (20) seconds under the spot interleaving method. When comparing the rank filling method to the proposed method for Request 1, the rank filling method and proposed method both have an average complete time of ten (10) seconds. However, the revisit time may range between 15-25 seconds under the proposed method compared to a revisit time of twenty (20) seconds under the rank filling method.

When comparing the proposed method to the spot interleaving and rank filling methods for Request 2, the proposed method outperforms the spot-interleaving and rank filling methods in the category of average complete time. Under the spot-interleaving and rank filling methods, the average complete times for Request 2 are twenty-nine (29) and twenty-five (25) seconds, respectively, while the average complete time under the proposed method is twenty (20) seconds. When comparing the revisit time between the spot-interleaving method and the proposed method for Request 2, the revisit time for the spot-interleaving method is thirty (30) seconds while the revisit time for the proposed method is 25-35 seconds. When comparing the revisit time between the rank filling method and the proposed method for Request 2, the revisit time for both methods is 25-35 seconds.

Embodiments or implementations may be made in hardware, firmware, software, or various combinations thereof. Embodiments or implementations may also be implemented as instructions stored on a machine-readable medium, which may be read and executed using one or more processing devices. In one embodiment, the machine-readable medium may include various mechanisms for storing and/or transmitting information in a form that can be read by a machine (e.g., a computing device). For example, a machine-readable storage medium may include read only memory, random access memory, magnetic disk storage media, optical storage media, flash memory devices, and other media for storing information, and a machine-readable transmission media may include forms of propagated signals, including carrier waves, infrared signals, digital signals, and other media for transmitting information. While firmware, software, routines, or instructions may be described in the above disclosure in terms of specific exemplary aspects and implementations performing certain actions, it will be apparent that such descriptions are merely for the sake of convenience and that such actions in fact result from computing devices, processing devices, processors, controllers, or other devices or machines executing the firmware, software, routines, or instructions.

Although the above disclosure discusses what is currently considered to be a variety of useful embodiments, it is to be understood that such detail is solely for that purpose, and that the appended claims are not limited to the disclosed embodiments, but, on the contrary, is intended to cover modifications and equivalent arrangements that are within the spirit and scope of the appended claims.

What is claimed is:

1. A computer-implemented method for scheduling resources, the method comprising:
   receiving, in a processor, a plurality of concurrent processing requests, wherein each concurrent processing request is associated with at least one device configured to perform one or more different tasks at a given time,
   wherein the at least one device has a predefined processing capacity,
   wherein if one or more of the plurality of concurrent processing requests exceeds the predefined capacity of the at least one device at the given time,
      the processor determines a first priority score comprising a maximum priority score for each concurrent processing request based on a multiple of an amount of time required to complete each concurrent processing request and a time relative to a scheduled revisit time by ensuring each concurrent processing request is completed before it is scheduled to repeat,
      determines a second priority score comprising a minimum priority score for each concurrent processing request based on a respective revisit time of each concurrent processing request and whether any one of the concurrent processing requests is currently being processed at the given time, wherein the respective revisit time is a point in time at which a request is scheduled to be revisited,
      and determines a final priority score for each concurrent processing request based on the first priority score and the second priority score; and
   responsive to the determined final priority score at the given time, executing a highest priority processing request of the concurrent processing requests for the at least one device.

2. The method of claim 1, wherein the at least one device comprises one or more sensors, and the concurrent processing requests relate to one or more scans of the one or more sensors.

3. The method of claim 1, wherein the processor determines the priority score for each concurrent processing request by determining which of said concurrent processing requests are capable of being executed concurrently, said processor being configured to adjust associated priority scores for the requests that are capable of being executed concurrently.

4. The method of claim 3, wherein said processor is further configured to adjust priority scores for the processing requests that are capable of being executed concurrently based, at least in part, on user inputted values.

5. The method of claim 1, wherein each concurrent processing request has one or more priority curves associated therewith.

6. The method of claim 5, wherein an associated priority score for each concurrent processing request is based, at least in part, on one or more of the priority curves.

7. The method of claim 5, wherein one or more priority curves are non-linear.

8. The method of claim 5, wherein at least one of the priority curves comprises a hard constraint, wherein an associated priority score changes to a predetermined value at a particular time.

9. The method of claim 1, wherein the priority score for each concurrent processing request is based, at least in part, on user inputted values.

10. The method of claim 9, further comprising using the user inputted values to adjust a degree of interleaving and periodicity of the concurrent processing requests.

11. The method of claim 2, wherein the one or more sensors comprise at least one of a synthetic aperture radar, a multispectral thermal imager, and an intelligence surveillance reconnaissance system.

12. A system for scheduling resources, comprising:
at least one device having a predefined processing capacity, wherein the at least one device is configured to execute a highest priority processing request; and
a processor configured to:
receive a plurality of concurrent processing requests, wherein each concurrent processing request is associated with at least one device configured to perform one or more different tasks at a given time,
wherein if one or more of the plurality of concurrent processing requests exceeds the predefined capacity of the at least one device at the given time,
the processor determines a first priority score comprising a maximum priority score for each concurrent processing request based on a multiple of an amount of time required to complete each concurrent processing request and a time relative to a scheduled revisit time by ensuring each concurrent processing request is completed before it is scheduled to repeat,
determines a second priority score comprising a minimum priority score for each concurrent processing request based on a respective revisit time of each concurrent processing request and whether any one of the concurrent processing requests is currently being processed at the given time, wherein the respective revisit time is a point in time at which a request is scheduled to be revisited,
and determines a final priority score for each concurrent processing request based on the first priority score and the second priority score; and
responsive to the determined final priority score at the given time, executing a highest priority processing request of the concurrent processing requests for the at least one device.

13. The system of claim 12, wherein the at least one device comprises one or more sensors, and the concurrent processing requests relate to one or more scans of the one or more sensors.

14. The system of claim 12, wherein the processor is configured to determine the priority score for each concurrent processing request by determining which of said processing requests are capable of being executed concurrently, said processor being configured to adjust associated priority scores for the requests that are capable of being executed concurrently.

15. The system of claim 14, further comprising a user interface, wherein said processor is further configured to adjust priority scores for the processing requests that are capable of being executed concurrently responsive to user inputted values received via the user interface.

16. The system of claim 12, wherein each concurrent processing request has one or more priority curves associated therewith.

17. The system of claim 16, wherein the priority score for each concurrent processing request is based, at least in part, on one or more of the associated priority curves.

18. The system of claim 16, wherein one or more priority curves are non-linear.

19. The system of claim 16, wherein the one or more priority curves further comprise a hard constraint, wherein the priority score changes to a predetermined value at a particular time.

20. The system of claim 12, wherein the priority score for each concurrent processing request is based, at least in part, on user inputted values.

21. The system of claim 20, wherein the user inputted values are configured to adjust a degree of interleaving and periodicity of the concurrent processing requests.

22. The system of claim 13, wherein the one or more sensors comprise at least one of a synthetic aperture radar, a multispectral thermal imager, and an intelligence surveillance reconnaissance system.

23. A computer program product, comprising:
a non-transitory machine-readable medium having machine-readable program embodied therein, said machine-readable program, when executed by a processor, being configured to carry out resource scheduling functions comprising:
receiving a plurality of concurrent processing requests, wherein each concurrent processing request is associated with at least one device configured to perform one or more different tasks at a given time, wherein the at least one device has a predefined processing capacity, wherein if one or more of the plurality of concurrent processing requests exceeds the predefined capacity of the at least one device at the given time,
the processor determining a first priority score comprising a maximum priority score for each concurrent processing request based on a multiple of an amount of time required to complete each concurrent processing request and a time relative to a scheduled revisit time by ensuring each concurrent processing request is completed before it is scheduled to repeat,
determining a second priority score comprising a minimum priority score for each concurrent processing request based on a respective revisit time of each concurrent processing request and whether any one of the concurrent processing requests is currently being processed at the given time, wherein the respective revisit time is a point in time at which a request is scheduled to be revisited,
and determining a final priority score for each concurrent processing request based on the first priority score and the second priority score; and
responsive to the determined final priority score at the given time, executing a highest priority processing request of the concurrent processing requests for the at least one device.

24. The computer program product of claim 23, wherein the at least one device comprises one or more sensors, and the concurrent processing requests relate to one or more scans of the one or more sensors.

25. The computer program product of claim 23, wherein the processor determines the priority score for each concurrent processing request by determining which of said concurrent processing requests are capable of being executed concurrently, said processor being configured to adjust associated priority scores for the requests that are capable of being executed concurrently.

26. The computer program product of claim 25, wherein said processor is further configured to adjust priority scores for the processing requests that are capable of being executed concurrently based, at least in part, on user inputted values.

27. The computer program product of claim 23, wherein each processing request has one or more priority curves associated therewith.

28. The computer program product of claim 27, wherein an associated priority score for each concurrent processing request is based, at least in part, on one or more of the priority curves.

29. The computer program product of claim 27, wherein the one or more priority curves are non-linear.

30. The computer program product of claim 27, wherein at least one of the priority curves comprises a hard constraint, wherein an associated priority score changes to a predetermined value at a particular time.

31. The computer program product of claim 23, wherein the priority score for each concurrent processing request is further based, at least in part, on user inputted values.

32. The computer program product of claim 31, wherein the user inputted values are configured to adjust a degree of interleaving and periodicity of the concurrent processing requests.

33. The computer program product of claim 24, wherein the one or more sensors comprise at least one of a synthetic aperture radar, a multispectral thermal imager, and an intelligence surveillance reconnaissance system.

* * * * *